United States Patent
Holmes et al.

(10) Patent No.: US 8,739,250 B2
(45) Date of Patent: May 27, 2014

(54) DENIAL OF SERVICE ATTACK RESISTANT INPUT PORT

(75) Inventors: Lee Holmes, Renton, WA (US); Hitesh Raigandhi, Redmond, WA (US); Nathan Burkhart, Seattle, WA (US); David B. Cross, Redmond, WA (US); Manoj K. Ampalam, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 178 days.

(21) Appl. No.: 13/310,816

(22) Filed: Dec. 5, 2011

(65) Prior Publication Data

US 2013/0145428 A1    Jun. 6, 2013

(51) Int. Cl.
*H04L 29/06* (2006.01)
*G06F 7/04* (2006.01)
*G06F 15/16* (2006.01)
*G06F 17/30* (2006.01)

(52) U.S. Cl.
USPC .................................. 726/4; 726/2; 370/278

(58) Field of Classification Search
USPC ............................................ 726/13; 713/201
See application file for complete search history.

(56) References Cited

U.S. PATENT DOCUMENTS

| | | | |
|---|---|---|---|
| 7,496,950 B2 | 2/2009 | Carley | |
| 7,716,729 B2 | 5/2010 | Bhatia | |
| 8,259,628 B2 * | 9/2012 | El Zur | 370/278 |
| 8,353,003 B2 * | 1/2013 | Noehring et al. | 726/2 |
| 8,429,742 B2 * | 4/2013 | Stockdell | 726/22 |
| 2006/0282880 A1 * | 12/2006 | Haverinen et al. | 726/3 |
| 2008/0172739 A1 * | 7/2008 | Nakae et al. | 726/22 |
| 2011/0107394 A1 * | 5/2011 | Jenne et al. | 726/2 |

OTHER PUBLICATIONS

"Combating Botnets Using the Cisco ASA Botnet Traffic Filter", Retrieved at <<http://www.cisco.com/en/US/prod/collateral/vpndevc/ps6032/ps6094/ps6120/white_paper_c11-532091.html>>, Retrieved Date: Sep. 28, 2011, pp. 11.
"Protecting the Cisco Catalyst 6500 Series Switches Against Denial-Of-Service Attacks", Retrieved at <<http://www.cisco.com/en/US/prod/collateral/switches/ps5718/ps708/prod_white_paper0900aecd802ca5d6.pdf>>, Retrieved Date: Sep. 28, 2011, pp. 18.
"Secure Cyber Systems", Retrieved at <<http://www.securecybersystems.com/immune-architecture.html>>, Retrieved Date: Sep. 29, 2011, pp. 4.
"SBC controls", Retrieved at <<http://www.acmepacket.com/enterprise-products-session-border-controller-sbc-controls.htm>>, Retrieved Date: Sep. 29, 2011, p. 1.
"Denial of Service / Distributed Denial of Service—Managing DoS Attacks", Retrieved at <<http://www.dbcde.gov.au/__data/assets/pdf_file/0011/41312/DoS_Report.pdf>>, Jun. 2006, pp. 68.

* cited by examiner

*Primary Examiner* — Shin-Hon Chen
(74) *Attorney, Agent, or Firm* — Henry Gabryjelski; Kate Drakos; Micky Minhas

(57) ABSTRACT

An input port for a computer system may retain potentially authenticable requests for processing while removing other connection requests from an incoming queue or request pool. The input port may continue to receive new requests even during a denial of service attack, allowing potentially legitimate requests to be processed. In a typical embodiment, a first in, first out buffer may be used to receive and process connection requests. When the buffer is full, any request that comes from a device having a previous connection with the computer system may be retained for authentication, while removing requests that come from unknown devices. Some embodiments may retain a list of known devices associated with administrators or other known users, and the list may be updated as those users are authenticated.

20 Claims, 4 Drawing Sheets

DENIAL OF SERVICE ATTACK RESISTANT INPUT PORT

BACKGROUND

Denial of service attacks attempt to flood the input mechanisms of a computer device with so many requests that legitimate connections are prevented from being established. In a typical denial of service attack, a malicious entity may attempt to overwhelm a computer device with illegitimate requests that consume the device's resources. When the device's resources are consumed, legitimate requests from administrators and proper users may not be serviced.

SUMMARY

An input port for a computer system may retain potentially authenticable requests for processing while removing other connection requests from an incoming queue or request pool. The input port may continue to receive new requests even during a denial of service attack, allowing potentially legitimate requests to be processed. In a typical embodiment, a first in, first out buffer may be used to receive and process connection requests. When the buffer is full, any request that comes from a device having a previous connection with the computer system may be retained for authentication, while removing requests that come from unknown devices. Some embodiments may retain a list of known devices associated with administrators or other known users, and the list may be updated as those users are authenticated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
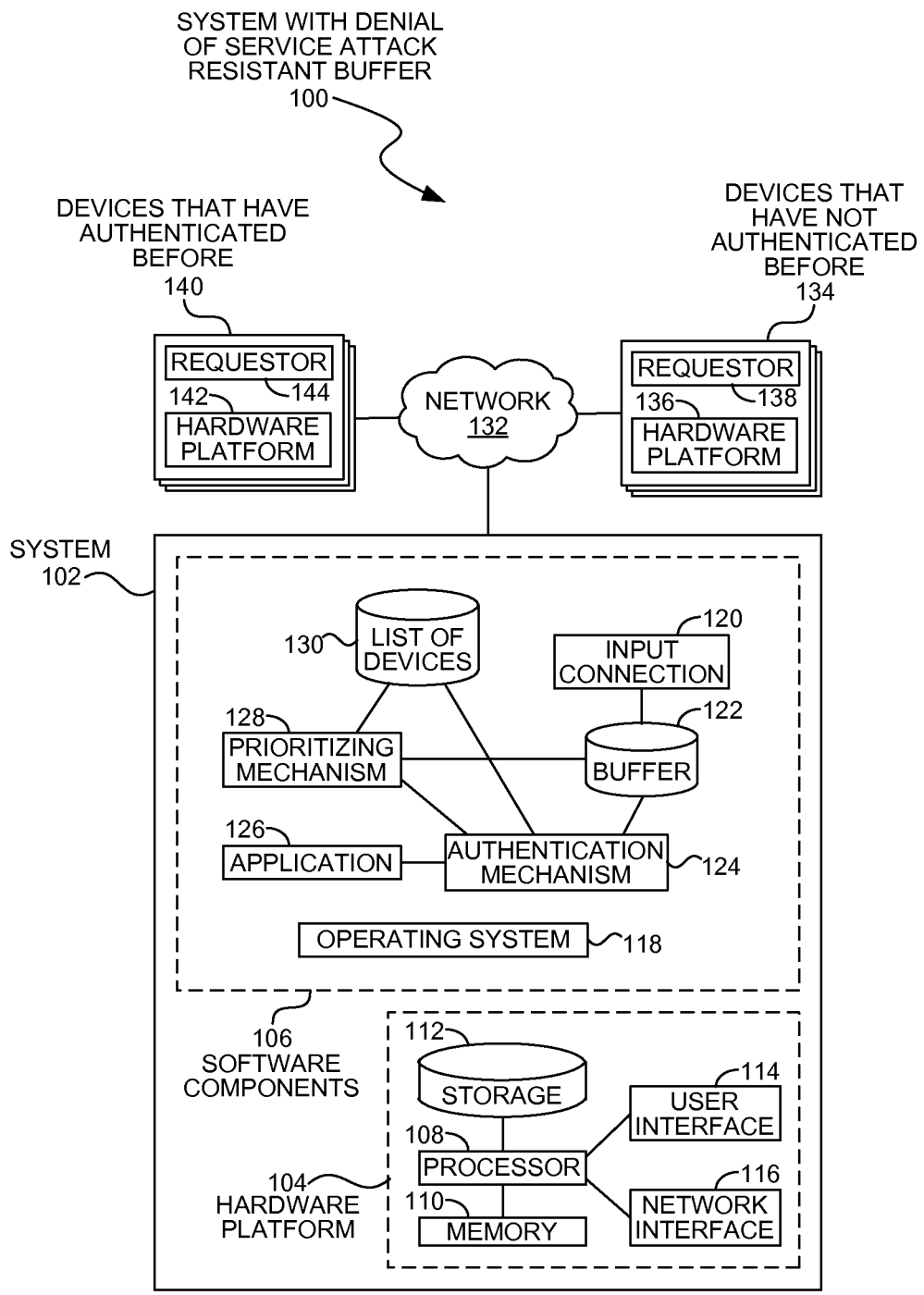
FIG. 1 is a diagram illustration of an embodiment showing a system for with a buffer that may be resistant to a denial of service attack.

An input system for authenticating communication requests may identify possibly authenticable requests in an input mechanism and hold those requests for authentication. The input mechanism may be a queue, buffer, pool, or other temporary storage mechanism that holds requests waiting for authentication, and the input mechanism may discard a request prior to authentication when the mechanism becomes full.

A prioritizer may mark requests that are potentially authenticable request so that the input mechanism will not discard the marked requests, thereby causing those requests to be processed by an authenticator.

In a denial of service attack, an input system may be inundated by large volumes of requests. This type of attack attempts to flood a system with unwanted or illegitimate requests so that legitimate requests are prevented from being processed. Because an input system can only hold a finite number of requests and the authenticating process takes some computer resources, one form of a denial of service attack attempts to overwhelm an authenticating mechanism by causing it to repeatedly attempt to authenticate requests. Such an attack may cause the attacked system to become unresponsive or very slow while resources are used to process the requests.

In many input systems, incoming requests may be stored in a buffer or queue. For the purposes of this specification and claims, the term "buffer" is used as a generic term that encompasses buffers, queues, pools, or any other temporary storage system that holds items to be processed.

Many input systems may be designed with a first-in, first-out buffer. When the buffer becomes full, some buffers may discard the oldest request to make room for a new request, even though the oldest request may not have been processed by an authenticator. Other buffers may use a 'random removal' method by which a random request may be removed from the buffer to make room for an incoming request. Still other buffers may have other methods for removing one request to make room for another one.

The prioritizer may cause certain requests to be processed even when the input buffer is full. In some embodiments, the prioritizer may mark certain requests within the buffer, while other embodiments may store marked requests in a separate queue or buffer.

The prioritizer may use a specific set of criteria to mark requests. The criteria may be, for example, requests that come from devices from which a user has successfully authenticated. Such criteria may be useful to allow known users to access a system. Another set of criteria may be to mark requests that have come from users with administrative privileges. Such criteria may be useful to allow an administrator to access a system during an attack, allowing the administrator to make changes to the system to thwart the attack.

A list of trusted users may include identifiers for requests that will be marked by the prioritizer. The list may be defined manually ahead of time, or may be automatically generated. One mechanism for automatically generating the list may be to identify successfully authenticated requests that meet the predefined criteria, then add the request to the list.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may have a denial of service attack resistant input mechanism. Embodiment 100 is a simplified example of a computer system that may receive communication requests and may prioritize certain requests when those requests are similar to requests that were previously authenticated.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is a simplified example of a network environment in which a device may have an input mechanism that may be resistant to denial of service attacks. A device 102 may operate on a network 132 where devices 134 that have not previously authenticated inundate the device 102 with communication requests, while devices 140 that have authenticated before also attempt to authenticate. In a denial of service attack, the devices 134 may attempt to overwhelm the device 102 so that the devices 140, which may be presumed to be legitimate users, may not be able to access device 102.

When connecting to an authenticated device, a requesting device may send a request that may be challenged by an authenticator. The requesting device may respond with credentials which the authenticator may or may not accept. When the credentials are accepted by the authenticator, the requesting device may be granted a communication session and communication may begin.

During a denial of service attack on such a system, the devices 134 may flood the system 102 with requests. Many of the requests may go unanswered as the input buffer of system 102 may become full. The system 102 may identify those requests that have a higher probability of successful authentication by comparing the requests with a list of devices. The list of devices may contain identifiers for devices that are associated with authenticated users.

The requests that match the list of devices may be saved for authentication and may not be discarded by the normal buffer processes when the buffer is full.

The criteria for placing a device on the list of devices may be different in various embodiments. Some embodiments may have devices on the list that are for users with specific privileges, such as administrative or other elevated privileges, for example. Other embodiments may place any previously authenticated device on the list, regardless of the privileges of the authenticated user.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

An input connection 120 may be a mechanism by which requests for access may be received. In some embodiments, the input connection 120 may be a port, protocol, or other mechanism by which requests are received.

The requests may be placed in a buffer 122 that may temporarily store the requests while waiting for an authentication mechanism 124 to authenticate the request and establish a communication session. If a communication session is established, a user from a remote device may have access to an application 126 or some other service or capability.

Requests may be analyzed to determine whether or not the requests are potentially authenticable by a prioritizer 128. The prioritizer 128 may attempt to identify requests that have a higher probability of successful authentication from the large volume of requests that may flood the device 102 during an attack.

The prioritizer 128 may identify legitimate requests by comparing information in the request to identifiers in the list of devices 130. The information may be any type of identifier that may be present in a request. Such identifiers may be network addresses, such as an IPv4 or IPv6 address, device identifiers such as a MAC address or Electronic Identification Number (EIN), or other identifier. In some cases, the requests may have routing information, user information, or other identifiers.

The list of devices 130 may contain a list of known devices which may be expected to yield a successful authentication. The list may be created manually or automatically. A manual creation process may involve an administrator determining the identifiers and adding the identifiers to the list.

In a system with automatic list management, successfully authenticated requests may be added to the list when the authentication meets specific criteria. The criteria may be, for example, that the user has certain privileges, such as elevated or administrative privileges. In such a system, each time a user meeting the criteria is successfully authenticated, the identifiers for the request may be added to the list.

The network 132 may be any type of network, such as the Internet, from where devices may attempt to connect to the system 102. The devices 134 may be devices that have not previously authenticated to the system 102, while devices 140 may be devices that have authenticated before.

The devices 134 and 140 may have a hardware platform 136 and 142, respectively. The devices 134 and 140 may be server computers, desktop computers, cellular telephones, game consoles, sensor devices, or any other type of device that may be connected to the network 132.

Each of the devices 134 and 140 may have a requestor 138 and 144, respectively. The requestor may be an application, a user operating an application, or some other mechanism that may initiate a request to the system 102. In a typical embodiment, the requestor may be a user who attempts to authenticate to the system 102 using a web browser, although many other technologies may be used to establish a communication session with the system 102.

During a malicious attack, the requestor 138 may be a virus or other malware that may send repeated requests during a denial of service attack. Such requests may be sent with or without a device user's knowledge or consent.

Figure 2:
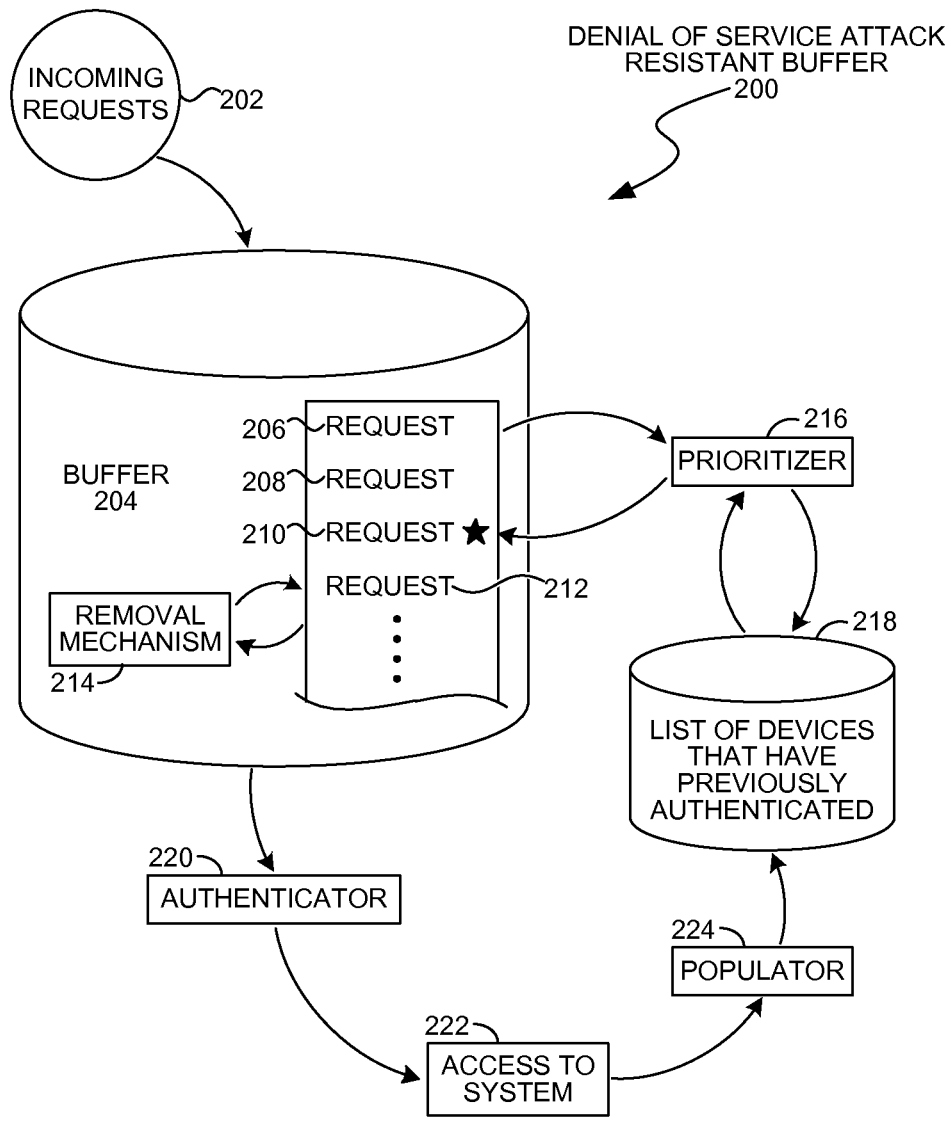
FIG. 2 is a diagram illustration of an embodiment showing an architecture of a denial of service attack resistant buffer.

FIG. 2 is a diagram illustration of an embodiment 200 showing the interaction and sequencing of the various components of a denial of service resistant system. Embodiment 200 is merely one example of the functional components that may provide the denial of service resistant system.

Embodiment 200 shows a typical architecture that contains different functional elements. Other embodiments may have different functional elements or may combine the elements in different fashions.

Incoming requests 202 may be received by a buffer 204. The buffer 204 is illustrated with requests 206, 208, 210, and 212.

The buffer 204 may have a removal mechanism 214 that may remove one of the requests already in the buffer when a new request is received. Such an embodiment may continually receive new requests, but may discard requests when new requests are received.

One type of buffer that may be used is a first-in, first-out buffer. When the buffer may be full, a new request may remove the oldest request from the buffer even though the oldest request may not have been serviced. Other embodiments may have different mechanisms for removing unprocessed requests when the buffer is full.

An authenticator 220 may pull the oldest requests from the buffer and attempt to process the request to authenticate the requestor. When the request is properly authenticated, the requestor may be granted access to the system 222.

A prioritizer 216 may evaluate the incoming requests and compare them to a list 218 that contains previously authenticated requests. When there is a match, the prioritizer 216 may mark a request, such as request 210 which is marked with a star.

The marked requests may be saved when the removal mechanism 214 attempts to remove unprocessed requests. When the request 210 is marked, the removal mechanism 214 may not consider request 210 for removal. Thus, the request 210 may be retained until the authenticator 220 may process the request 210.

When a request is fully authenticated, a populator 224 may evaluate the request to determine if the request meets criteria for the list 218. If the request does meet the criteria, the request may be added to the list 218. The list may contain device identifiers that are received in a request. The list may sometimes be referred to as a list of requests or list of devices.

Figure 3:
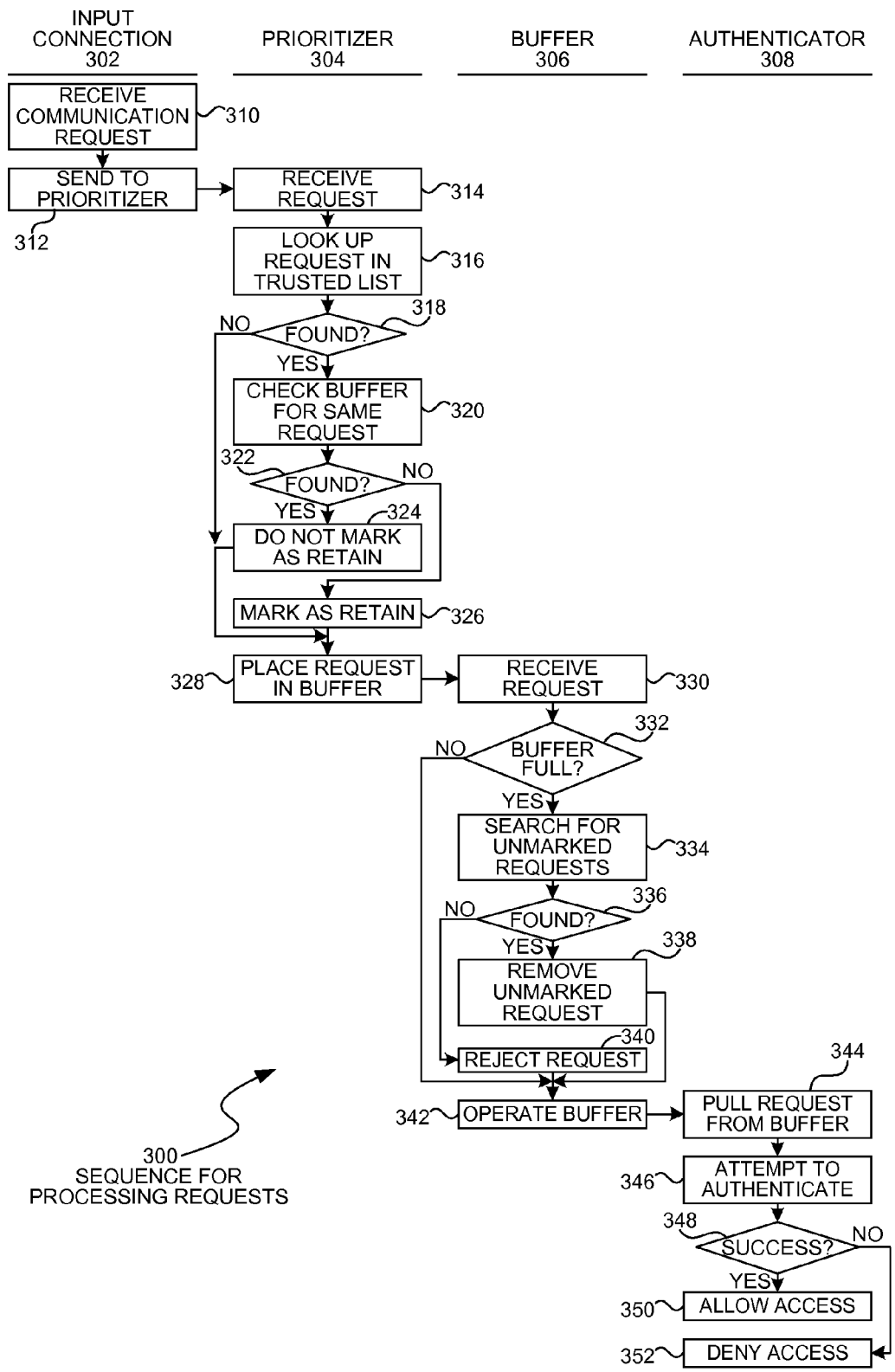
FIG. 3 is a flowchart illustration of an embodiment showing a method for processing access requests.

FIG. 3 is a flowchart illustration of an embodiment 300 showing a method for processing requests. The process of embodiment 300 is a simplified example of one method that may be performed by a system with a denial of service attack resistant input mechanism, such as the system 102 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 shows the operations of an input connection 302 in the left hand column, a prioritizer 304 in the second column, a buffer 306 in a third column, and an authenticator 308 in the right hand column.

Embodiment 300 shows an embodiment where the prioritizer 304 processes requests before the requests are stored in the buffer 306. In contrast, embodiment 200 showed a different embodiment where the requests may be stored in a buffer prior to being analyzed by a prioritizer.

The input connection 302 may receive a communication request in block 310 and may send the request to the prioritizer 304 in block 312.

The prioritizer 304 may receive the request in block 314 and may look up any identifiers in a trusted list of devices in block 316. The identifiers may be any identifier that may be part of or associated with the request. The identifiers may help identifying a request as being from a user or device that has a high probability of being authenticated.

If the identifier is found in block 318, the buffer may be checked to determine if another request can be found in the buffer with the same identifier. If the current request is the only request that is from the matching device, the request is marked to be retained in block 326.

The buffer is checked in block 320 to prevent multiple requests from the same device. Such an algorithm may be useful to minimize the effects of a denial of service attack that may be instigated from a device on the trusted list. Because only one request may be marked from a particular source, that source may not perpetrate a denial of service attack even when compromised with malware.

If the identifier is found in another request in the buffer in block 322, the request may not be marked as retain in block 324, similar to a request that is not found in the trusted list in block 318.

After processing the request, the prioritizer 304 may place the request in the buffer in block 328.

The buffer 306 may receive the request in block 330. If the buffer is full in block 332, a search may be made in the buffer for unmarked requests in block 334. If an unmarked request is found in block 336, the unmarked request may be removed in block 338 to make room for the new request.

The search for an unmarked request in block 334 may begin searching at the oldest request in the buffer and work towards the newer requests. Other embodiments may make a random search or have some other search algorithm.

If the buffer is not full in bock 332, the request may be added to the buffer without removing any existing requests.

If the buffer is full, but no unmarked requests are found in block 336, the request may be rejected. Such a situation may happen when the buffer is full of marked requests. In many embodiments, the size of the buffer may be larger than the size of the list of trusted devices. In such embodiments, the situation of block 336 may not be encountered.

After adding the request to the buffer, the buffer 306 may operate as a storage device for the authenticator 308 in block 342.

The authenticator 308 may pull a request from the buffer in block 344 and attempt to authenticate the request in block 346. In many embodiments, the authenticator 308 may challenge the requestor to provide credentials. The credentials may be, for example, a user name and password. The requestor may respond with the credentials, resulting in success in block 348 and allowed access in block 350.

If the requestor supplies credentials that are invalid, or the requestor fails to respond to the challenge, the attempt to authenticate may be a failure in block 348, resulting in a denial of access in block 352.

Figure 4:
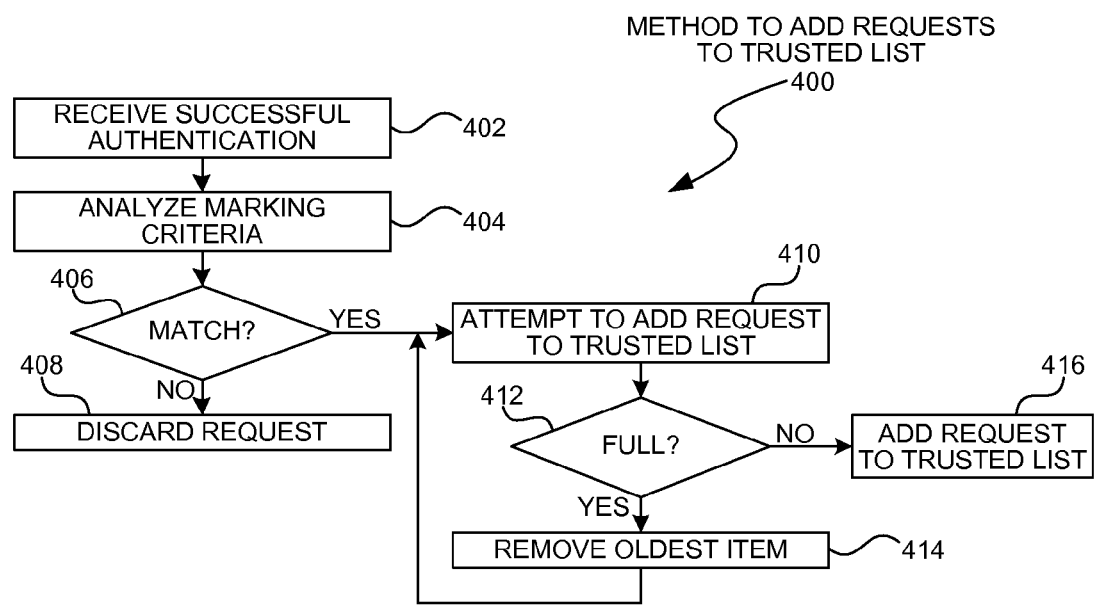
FIG. 4 is a flowchart illustration of an embodiment showing a method for adding requests to a trusted list.

FIG. 4 is a flowchart illustration of an embodiment 400 showing a method for adding requestors to a trusted list. The process of embodiment 400 is a simplified example of one method that may be performed by a populator, such as the populator 224 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates one method by which authenticated requests may be added to a list of trusted devices in an automated manner. The operations of embodiment 400 may be performed by a device, such as the system 102, to collect devices from which authenticated users or specific authenticated users connect to the device. Over time, the device may develop a list of devices or requests that are likely to contain authenticable requests so that then a denial of service attack occurs, those users may be able to establish a connection even while the attack is underway.

A successful authentication may be received in block 402. The marking criteria may be analyzed in block 404 to determine if there is a match.

The marking criteria may define which types of authenticated sessions are to be marked by a prioritizer. In many cases, authenticated sessions from privileged users may be marked. Some embodiments may have very few authenticated users, and such embodiments may include all users in the marking criteria. Some embodiments may have large numbers of authenticated users, and such embodiments may only mark those users with elevated privileges, such as power user, super user, or administrative privileges.

When there is no match in block 406, the request may be discarded in block 408.

When there is a match in block 406, an attempt may be made to add the request to the trusted list in block 410. If the trusted list is full in block 412, the oldest item in the list may be removed in block 414 and the process may return to block 406.

If the trusted list is not full in block 412, the request may be added to the trusted list in block 416.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a processor;
an input connection that receives connection requests;
an authentication mechanism that authenticates said connection requests to create authenticated sessions;
a buffer that stores said connection requests while said requests wait for said authentication mechanism;
a prioritizing mechanism, said prioritizing mechanism configured to:
 access connection requests from said storage buffer;
 determine if connection requests have increased potential for being authenticated by referring to priority criteria; and
 mark connection requests determined to have increased potential for being authenticated for retention in the buffer even when the buffer has no further room to store additional connection requests; and
a removal mechanism, said removal mechanism configured to:

access connection requests from said storage buffer when the buffer has no further room to store additional connection requests;
determine if accessed connection requests are marked for retention; and
consider unmarked connection requests for removal from the buffer.

2. The system of claim 1, said buffer being a first in, first out buffer.

3. The system of claim 1, wherein said prioritizing mechanism being configured to determine if connection requests have increased potential for being authenticated by referring to priority criteria comprises said prioritizing mechanism being configured to determine that a connection request has increased potential for being authenticated by detecting that said connection request is from a user having a first set of privileges.

4. The system of claim 3, said first set of privileges being administrative privileges.

5. The system of claim 3, wherein said prioritizing mechanism being configured to determine if connection requests have increased potential for being authenticated by referring to priority criteria comprises said prioritizing mechanism being configured to determine that a connection request has increased potential for being authenticated by detecting that said connection request is from a device that has previously been authenticated by the authentication mechanism.

6. The system of claim 1 further comprising:
a list of devices used by authenticated users; and
wherein said prioritizing mechanism being configured to determine if connection requests have increased potential for being authenticated by referring to priority criteria comprises said prioritizing mechanism being configured to refer to said list of devices.

7. The system of claim 6 further comprising:
a list updater, said list updated configured to:
identify successfully authenticated connection requests; and
add devices and/or authenticate users associated with successfully authenticated connection requests to said list.

8. The system of claim 7, said list updater being configured to identify successfully authenticated connection requests comprises said list update being configured to identify a successfully authenticated connection request from an administrative user.

9. The system of claim 8, said list of devices comprising a fixed number of entries.

10. The system of claim 9, said list of devices being stored in a first in, first out buffer.

11. At a computer system the computer system including a processor and a storage buffer, said storage buffer configured to store received communication access requests until the received access requests can be processed for authentication, the received communication access requests including requests to establish a communication session with the computer system, a method performed on said processor, a method for processing received communication access requests, said method comprising:
accessing a first communication access request from said storage buffer;
determining said first communication access request has reduced potential for being authenticated by referring to priority criteria;
accessing a second later received communication request from said storage buffer;
determining said second communication access request has increased potential for being authenticated by referring to said priority criteria;
detecting that said storage buffer has no further room to store received access requests
removing said first communication access request from said storage buffer prior to attempting to authenticate said first communication access request based on said first communication access request having reduced potential for being authenticated; and
retaining said second communication access request in said storage buffer for subsequent authentication based on said second communication access request having increased potential for being authenticated and not withstanding that said second communication access request was received after said first access request.

12. The method of claim 11, further comprising authenticating said second communication access request and adding said second communication access request to a list of authenticated requests.

13. The method of claim 12, said list of authenticated requests being successful requests for users with administrative privileges.

14. The method of claim 13 further comprising:
identifying a third communication access request being a successful request for a user with administrative privileges; and
adding said third communication access request to said list of authenticated requests.

15. The method of claim 13 further comprising:
determining that said list is full and removing a third communication access request from said list, said third communication access request being older than said second communication access request.

16. The method of claim 15, said list being stored in a first in, first out buffer.

17. An input mechanism for a computer device, said input mechanism comprising:
a first in, first out buffer that receives and stores connection requests for said computer device, said buffer that removes unprocessed requests when said buffer is full and new requests are received;
an authentication mechanism that attempts authentication for said connection requests;
a prioritizing mechanism, said prioritizing mechanism configured to:
access connection requests from said storage buffer;
determine if connection requests have increased potential for being authenticated by referring to priority criteria, said priority criteria including a list of previously authenticated requests; and
mark connection requests determined to have increased potential for being authenticated for retention in the buffer even when the buffer has no further room to store additional connection requests; and
a removal mechanism, said removal mechanism configured to:
access connection requests from said storage buffer when the buffer has no further room to store additional connection requests;
determine if accessed connection requests are marked for retention; and
consider unmarked connection requests for removal from the buffer.

18. The input mechanism of claim 17, said list of previously authenticated requests being a predefined list of requests from administrative users.

19. The input mechanism of claim 17, said list of previously authenticated requests comprising a smaller number of items than said buffer.

20. The input mechanism of claim 19, said list of previously authenticated requests comprising previously successfully authenticated requests from administrative users.

\* \* \* \* \*